Oct. 23, 1956   J. F. ROBINSON ET AL   2,767,556
VACUUM COOLING APPARATUS

Filed April 9, 1954   4 Sheets-Sheet 2

INVENTOR.
WELLS A. WEBB
JOSEPH F. ROBINSON
BY
Boyken, Mohler & Wood
ATTORNEYS

Oct. 23, 1956

J. F. ROBINSON ET AL

2,767,556

VACUUM COOLING APPARATUS

Filed April 9, 1954

INVENTOR.
WELLS A. WEBB
JOSEPH F. ROBINSON
BY

Boyken, Mohler & Wood

ATTORNEYS

Oct. 23, 1956  J. F. ROBINSON ET AL  2,767,556
VACUUM COOLING APPARATUS
Filed April 9, 1954  4 Sheets-Sheet 4

FIG_10

FIG_11

INVENTOR.
WELLS A. WEBB
JOSEPH F. ROBINSON
BY
Boyken, Mohler & Wood
ATTORNEYS

United States Patent Office 2,767,556
Patented Oct. 23, 1956

2,767,556

VACUUM COOLING APPARATUS

Joseph F. Robinson, San Francisco, and Wells A. Webb, Carmel, Calif., assignors, by mesne assignments, to Western Vegetable Industries, Inc., Salinas, Calif., a corporation of California Application April 9, 1954, Serial No. 422,144

11 Claims. (Cl. 62—6)

This invention relates to apparatus and method for creating a vacuum within an enclosed space and the control of the absolute pressure, or vacuum within said space.

Another object of the invention is the provision of a vacuum system for the treatment of food and any desired material and means for automatically controlling said system so that the food or other material or objects that are positioned within the vacuum or the space in which there is a reduced pressure is subjected to said vacuum or reduced pressure for a period of time that is automatically controlled by the degree of vacuum produced within the space in which the vacuum is created.

A still further object of the invention is the provision of improved means in a vacuum chamber for opening and for closing the same to admit material into the chamber for processing and to permit the exit of said material.

A precise application of the present invention is in the field of vacuum cooling fruit and vegetable products. At the present time, for example, large quantities of lettuce are pre-cooled by placing the harvested lettuce within a vacuum chamber and reducing the pressure within such chamber to a point and for a period of time sufficient to reduce the temperature of the heads of lettuce to about 32° F. This reduction in temperature is accomplished by the accelerated evaporation of the natural surface moisture that is on the lettuce leaves and within the heads of lettuce. In order to reduce the temperature of the heads to about 32° F. the absolute pressure within the vacuum chamber must be reduced to substantially .088 lb. per square inch. If the absolute pressure is less, the lettuce leaves may be frozen and injured, while a higher pressure will fail to reduce the temperature to the desired degree.

Heretofore the practice has been to sever the heads from their stalks in the field, and to immediately thereafter pack the lettuce in crates or in cartons.

The crates and cartons are then transported to the packing shed where the vacuum tank is located, and the crates or cartons are placed on cars that can be rolled into the vacuum tank, and as soon as an operator has cleared the tank of one batch, a new car is manually rolled into the tank. One or more operators are employed to roll a car into the tank and one or more may roll a previously treated car out of the tank. In many plants the loading and unloading of the tank occurs at one end only thus requiring the waiting car to be kept out of the way of the car that is being removed, and if both ends of the tank are opened or closed, there must be several operators at each end to handle the cars or else the incoming or waiting car must stand outside the tank until the operators clear the tank of the car that has been treated and then go to the other end of the tank and push the waiting car into the tank.

These operations are time consuming and costly from a labor standpoint, to say nothing of the cost involved in idling expensive vacuum drawing equipment during the loading and unloading of the tank. Furthermore, considerable variations in timing occur in the method above described since the system is manually controlled.

With the present invention the entire procedure of loading and unloading the vacuum tank, is automatic. The doors at opposite ends of the tank are opened and closed at substantially the same time. The incoming and outgoing loads are close together and move at the same time, by automatically controlled means.

Also heretofore the doors of the vacuum tanks have normally swung on hinges requiring the incoming loads to be spaced a substantial distance from the tank in order to permit the doors to swing open. This has resulted in a considerable loss in the capacity of the system since where each load may consist of over six tons of lettuce, an increase of one or several loads a day is a very substantial increase in tonnage and a corresponding decrease in costs.

Another object of the invention is improved door structure in the tank which provides for quick closing and opening of the tank within a minimum space outwardly of one or both ends of a tank, according to whether the tank is to be opened and closed at one end only or at both ends.

A still further object of the invention is the provision of a method of controlling the vacuum or absolute pressure within a tank, and an added object is the provision of improved control means.

In this connection it should be noted that the present control means is adapted to more or less conventional systems and also to a system in which a final lowering of the absolute pressure after it may have reached substantially .08 lb. per square inch, by the employment of silica-gel, refrigerated condenser or steam booster is used when the vapor load is low, can be accomplished with safety so as to obviate the chance of freezing products that may be in the vacuum tank.

Other objects and advantages will be obvious from the description and drawings.

Doors for vacuum chamber

Figure 1:
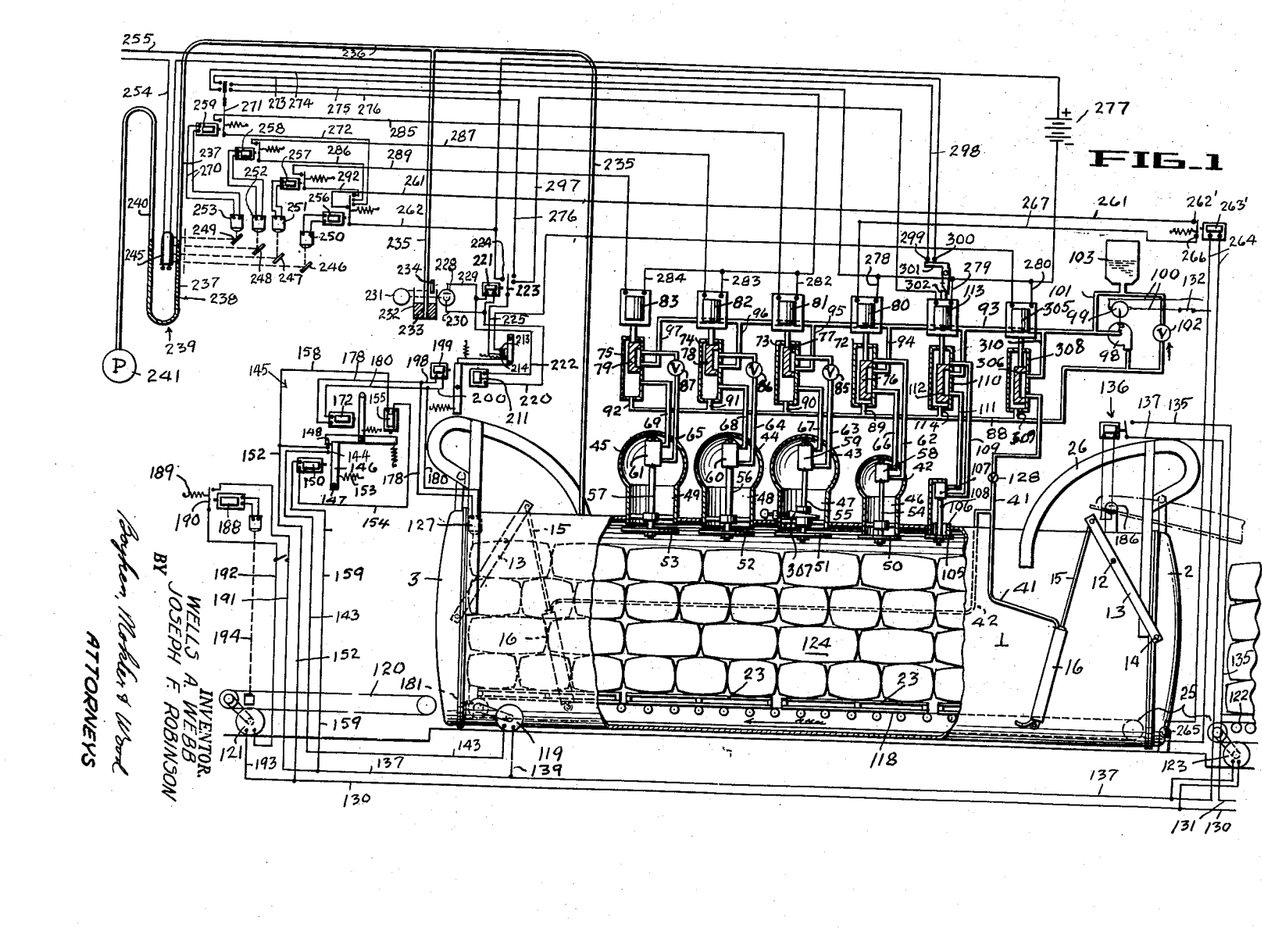
Fig. 1 is a semi-diagrammatic view of an automatic vacuum cooling system, the electrical and hydraulic circuits being schematic and the tank being broken away to show the interior of the tank and the valve housings being broken away to show the valves.

In connection with the tank doors as seen in Fig. 1 and in Figs. 6 to 10, it should be noted at the start that the doors and their mountings and the means for actuating them are identical. However, the doors of Fig. 1 are in an automatic system while the door of Figs. 6 to 10 is manually controlled, although hydraulically actuated to open the same.

Inasmuch as the doors at opposite ends of the tank are identical, the following description of one door will apply to either, and the same description is applicable to the door structure in all the figures, except as to the latch of Figs. 6 to 9.

Figure 6:
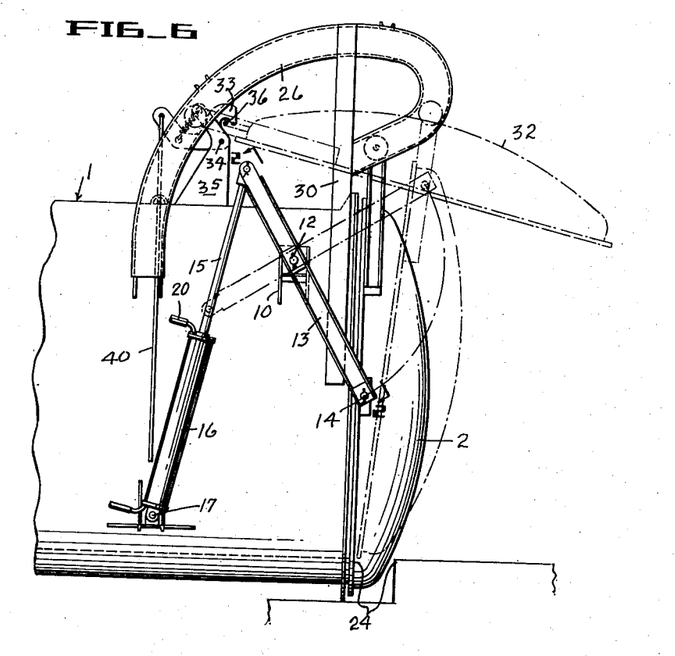
Fig. 6 is a fragmentary enlarged side elevational view of one of the doors of the tank when a manual release is used.
Figure 7:
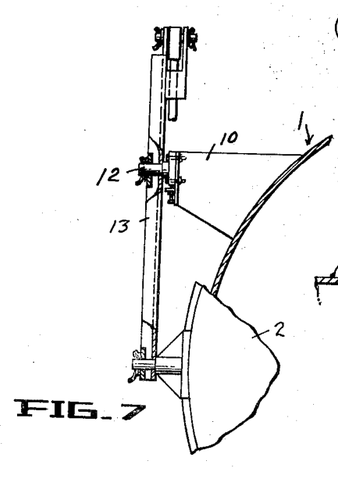
Fig. 7 is an enlarged fragmentary view of one portion of the door and its mounting as seen from the end of the tank.
Figures 8, 9:
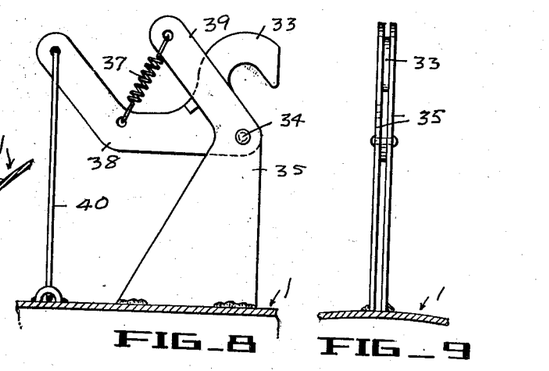
Fig. 8 is an enlarged view of the latch mechanism indicated on top of the tank in Fig. 6.
Fig. 9 is a view of the latch of Fig. 8 as seen at right angles, or edgewise to the view of Fig. 8.

Insofar as the air exhausting system is concerned, the same general system may be used in both the tank of Fig. 1 and of Fig. 6.

The vacuum tank in the drawings is generally designated 1 and is preferably cylindrical and horizontally disposed with a door 2 at one end and a door 3 at the other end, the door 2 being at the inlet end through which products enter the tank, and door 3 being at the discharge end from which produce is moved out of the tank.

Door 2 will be described in detail, and the numbers and parts used to describe it are applicable to door 3.

Around the end of the tank is a radially outwardly projecting flange 4 (Fig. 11) having secured to its outwardly facing flat side an annular hollow tube 5 rubber or the like that is adapted to form the airtight seal between the end of the tank and the door.

Figure 11:
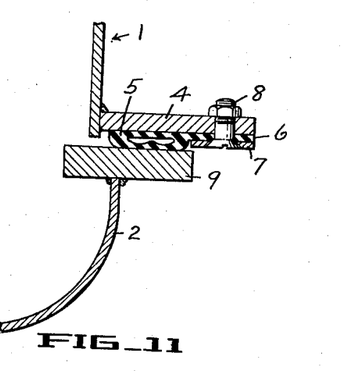
Fig. 11 is an enlarged fragmentary sectional view of the tank door as seen from line 11—11 of Fig. 10.

Tube 5 may be provided with an annular flange 6 that is tightly secured against the outwardly facing surface of the flange 4 around the radially outer side of ring 5 between a flat clamping ring 7 and the flange 4 by means of equally spaced bolts 8.

Doors 2, 3 are outwardly dished and have a flat ring 9 welded or otherwise suitably secured to the edges, which ring has its side facing the end of the tank parallel with flange 4 and adapted to engage the sealing ring 5.

A pair of brackets 10 are positioned at opposite sides of tank 1 adjacent each of the doors 2, 3 (Figs. 6, 7, 10), which brackets have coaxial horizontal pivots 12 thereon, and each pivot mounts an elongated arm 13 at a point intermediate the ends of said arms for swinging of said arms about the horizontal axis of said pivots. The pivots are carried on their brackets 10 a sufficient distance horizontally outwardly of the opposite sides of the tank so that the ends of the arms 13 will clear the flange 4 when they swing on their pivots.

One end of each arm 13 is pivotally connected at 14 (Figs. 6, 7) to the door 2 at diametrically opposite points. Since the pivots 12 are spaced from the door 2 at opposite sides of tank 1, but above the middle of the tank (vertically) and since pivots 14 are on door 2 it will be seen that the arms 13 will incline upwardly and away from the adjacent end of the tank 1 from pivots 14. Thus upon swinging the lower ends of arms 13 upwardly the door 2 will swing away from the end of tank 1 and upwardly. Also, this support of the door and arms 13 will result in the door being moved by gravity against the sealing ring 5 when any lifting force on arms 13 is removed.

Figure 10:
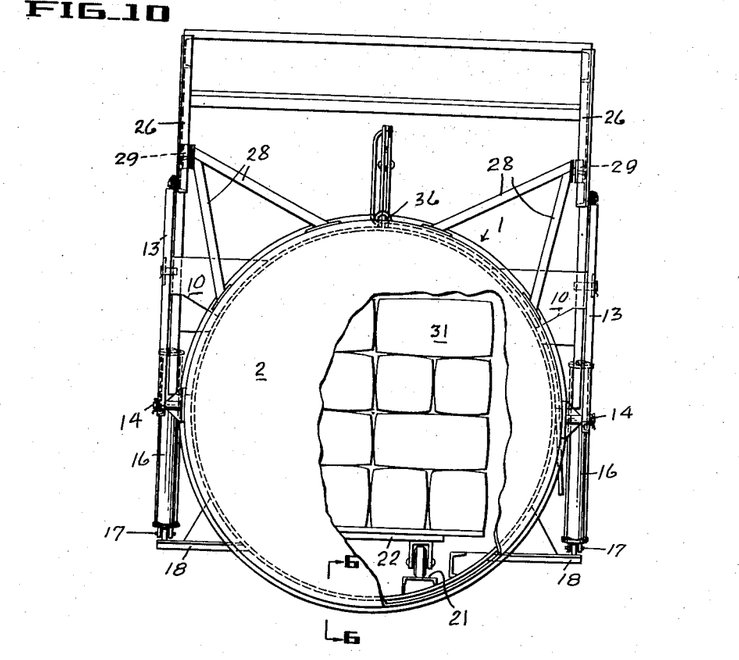
Fig. 10 is an end view of the tank of Fig. 6 in which rails and cars are used to carry the load into the tank, the end door of the tank being partially broken open to show the load.

The upper ends of arms 13 are pivotally secured to the upper ends of upwardly extending hydraulically actuated piston rods 15 that extend into cylinders 16 that, in turn, are pivoted at their lower ends at 17 (Fig. 6) to brackets 18 that project outwardly from the lower portion of tank 1 (Fig. 10).

An hydraulic pressure line 20 leads to the upper end of each cylinder 16. Upon fluid under pressure being admitted into the upper end of each cylinder the piston therein is moved downwardly thus moving rods 15 downwardly and swinging the lower ends of arms 13 upwardly for moving door 2 (or 3) outwardly and upwardly. The lower end of each cylinder 16 may be open so that there will be no substantial resistance below the pistons in said cylinders to movement of the rods upwardly or downwardly.

In order to convey material into the tank through the inlet end, in cars or a conveyor, it is obvious that the car tracks or conveyor supports that are in the tank be somewhat elevated above the lowermost portion of the tank. In Fig. 10 tracks 21 are indicated while in Fig. 1 a conveyor system is used, as will later be described more in detail.

Since tracks for cars outside the tank must terminate at the tank, or in any event the supporting means for the load that is brought to the tank may terminate at the tank, there will be a gap between such tracks or supporting means and the tracks or supporting means that is inside the tank. The cars 22 (Fig. 10) or flats 23 (Fig. 1) must jump this gap, hence it must be relatively small.

In order to keep this gap sufficiently small to enable the cars or flats to jump or to bridge the gap, the door cannot swing open in the usual manner, such as on pivots mounted on the tank either above or at the side of the tank.

In the present instance it is seen that the doors are carried on arms 13. To keep the gap 24 (Fig. 6) or 25 (Fig. 1) to a minimum, the upper end of the door is guided during opening and closing of said door in guide channels 26.

A pair of upwardly extending frames 28 (Fig. 10) on the door carry rollers 29 at their upper ends (Figs. 6, 10) each of which extends into one of the open opposed sides of channels 26.

These channels are secured by frame members 30 to the tank 1, and said channels are curved, as seen in Figs. 1, 6 so as to keep the lower end of the door close to the tank during the time when the door is moving out of the gap 24 or 25, and when the door is elevated a sufficient distance to clear the load 31 (Fig. 1) or a load on a car 22 that is outside the tank and close to the latter, the guide channels will cause the door to swing to a generally horizontally extending open position 32 (Figs. 1, 6) above the end of the tank 1. The door will be held in this position, either by a releasable latch 33 (Figs. 6, 8) or by the fluid in the upper end of the cylinder 16.

Where latch 33 is used, said latch is pivoted at 34 to a bracket 35 that is secured to the tank 1. The closed end of an inverted generally U-shaped member 36 secured to the upper end of door 2 (Fig. 10) is adapted to automatically lift the latch 33 for engagement by said latch when the door 2 moves to final open position, and a spring 37 connecting an extension 38 on latch 33 with an upward extension 39 on bracket 35 (Fig. 8) yieldably holds the latch in engagement with the U-member 36.

A jerk line 40 connected with extension 38 extends downwardly along a side of tank 1 to be manually grasped. When the pressure in line 20 is released and line 40 is pulled, the door 2 is released to fall by gravity to its closed position, and its descent is guided so as to travel down in the same path as it moved upwardly.

In Fig. 1 the hydraulic line 41 is the equivalent of line 20 in Fig. 6, but in Fig. 1 the latch 33 is not used, and the door is held open by pressure in the hydraulic line. Thus the opening and closing of the door in Fig. 1 is under complete control of the fluid in the hydraulic cylinders.

The foregoing description of the doors makes it clear that there are no clamps, latches, screws, nor any means whatsoever that locks the doors in sealed relation to the tank and that must be uncoupled, unscrewed or otherwise disconnected in order to open the doors. The reduced pressure within the tank functions to hold the doors in tight sealing engagement with the sealing tube or ring 5.

*Tank structure, conveyors, hydraulic system*

Referring to Fig. 1, tank 1 may be one of several that are in side by side relation in a row, and separate headers 42, 43, 44 and 45 extend transversely across the tanks longitudinally of the row. Steam jets or mechanical vacuum pumps, not shown, are connected with the headers. These headers respectively communicate with tank 1 through passageways 46, 47, 48 and 49, which passageways open at one of their ends into the headers and open into tank 1 at their opposite ends.

The ends of the passageways 46 to 49 inclusive, that open into tank 1 are provided with valves 50, 51, 52, 53 respectively having valve rods 54, 55, 56, 57 that extend into hydraulic cylinders 58, 59, 60, 61 for causing reciprocable movement of the valves from open position to closed position and vice versa upon admission of fluid under pressure into one end of each cylinder while the fluid is discharged from the other in the conventional manner for hydraulically actuated pistons, there being a piston (not shown) on each of the valve rods and within each cylinder.

Pipe lines 62, 63, 64, 65 extend respectively to the lower ends of cylinders 58, 59, 60, 61 so that when fluid under pressure flows through these lines the valves 50 and 53 incl. are moved to closed position, while fluid in the cylinders is discharged through pipes 66, 67, 68, 69 that extend from the upper ends of the cylinders, and when the flow of fluid is reversed, the valves will be opened by fluid flowing into the upper ends of the cylinders through pipes 66 to 69 incl. while fluid is discharged from the lower ends of the cylinders through pipes 62 and 65 incl.

The pipes 62, 66 leading to cylinder 58 extend to opposite end portions of a valve body 72. Pipes 63, 67 from cylinder 59 extend to opposite end portions of a valve body 73; pipes 64, 68 extend to opposite ends of a valve body 74, and pipes 65, 69 extend to opposite ends of a valve body 75.

Within valve bodies 72, 73, 74 and 75 respectively, are slide valves 76, 77, 78, 79 which valves are connected with solenoids 80, 81, 82, 83 respectively, for actuation of said valves in one direction when the solenoid coils are energized, and in the opposite direction under the influence of a spring reacting against the core of the solenoid when the circuit is broken and the solenoid coil de-energized.

Valves 85, 86, 87 are respectively in lines 63, 64, 65 which may be set to control the rate of closing and opening valves 51, 52, 53.

A main fluid pressure line 88 has branch lines 89, 90, 91, 92 connecting with valve bodies 72, 73, 74, 75 respectively while a main exhaust line 93 has branch lines 94, 95, 96, 97 leading to valve bodies 72, 73, 74, 75.

A pump 98 actuated by a motor 99 in any suitable circuit 100 connects line 93 with the pressure line 88 and a by pass 101 connecting line 93, with line 88 has a standard pressure relief valve 102 and a surge tank 103 are in the by pass 101.

In addition to the above valves 50 to 53, which may operate in passageways that are connected with headers that lead to other identical tanks having the same structure and arrangement, the tank 1 is provided with a valve 105 that is operable to open and to close an opening 106 formed in tank 1 and which opening communicates with the outside air.

A hydraulic cylinder 107 has a piston reciprocable therein between the ends of said cylinder, which piston (not shown) is connected by a rod 108 with valve 105.

Pipe line 109 connects the lower end of the cylinder 107 with a valve body 110 while line 111 connects the upper end of said cylinder 107 with the body 110. A slide valve 112 within body 110 is connected with solenoid 113. A branch line 114 connects pressure line 88 with body 110 and a branch discharge line also connects the body 110 with the main exhaust line 93.

Within the tank 1 is an endless conveyor 118 that is actuated for movement of its upper load carrying run in the direction of the arrow (from right to left as seen in Fig. 1) by an electric motor 119.

Outside the tank 1 at the discharge end adjacent to door 3 is a discharge conveyor 120 actuated by a motor 121 for taking the load from conveyor 118 when door 3 is open and when the conveyors 118, 120 are similarly actuated by their motors.

Outside tank 1 adjacent to the inlet end of said tank and door 2, is an endless conveyor 122 actuated by a motor 123 for moving a load into the conveyor.

A tank load of produce, which in the drawing shows cartons 124 containing lettuce, as an example, stacked on flats 23 in such a manner that there is no space between the cartons of the several flats. These flats are arranged end to end so that a continuous batch suitable for filling the tank 1 to capacity will be on conveyor in spaced relation to the adjacent batches, it being understood that conveyors 122 and 120 are each long enough to fully support one or several batches suitable for fully loading the tank 1.

If cars are used as seen in Fig. 10, it is only necessary to provide a single car for a full batch or several cars connected together for each batch, and to provide a motor for moving each batch into and out of the tank in virtually the same manner as where endless conveyors are used. In either instance a conveyor system is used.

It is pertinent to the automatic system that each tank load be packed as described for the reason that the beam of light falling on the photoelectric cell 127 at the discharge end of the tank 1 is broken by the load and is established at the gap between adjacent loads, as will be later described more in detail, and the making and breaking of this beam to cell 127 controls the actuator of motor 119 that in turn actuates conveyor 118.

Earlier in describing the door actuating arrangement, it was stated that the hydraulic line 20 (Fig. 6) was the equivalent of hydraulic line 41 in Fig. 1.

This line 41 connects with the valve body 110, and, as seen in Fig. 1 a similar line 42 leads to the cylinder 16 that actuates door 3, so doors 2 and 3 will be actuated simultaneously for closing and opening.

A valve 128 is in line 41 to control the rate of flow of fluid through the line and to the cylinders 16 so as to control the rate of opening and closing line 41 and to fully close said line when desired.

In describing the photoelectric cells in this invention, in each instance the interruption of the light beam to the cell will cause stoppage of the current in the circuit and solenoid associated with the cell, and the solenoid armature will then be retracted, in the usual manner, under the influence of a spring.

In each photoelectric cell circuit, it is understood that a source of current from any suitable source is provided for each such circuit, and the lighting unit for producing the beam that impinges on each cell also is provided with current from any suitable source. The wires leading to each cell and to each lighting unit for supplying the current are not shown since they would complicate the drawing, but it is to be understood that such current is supplied in each instance.

Conveyor circuit

Conductors 130, 131 connect with a source of electricity and lines 100 that connect with pump motor 99 may be directly connected with conductors 130, 131 respectively, with any suitable switch 132 in lines 100 for manually starting the motor 99. This motor can run continuously during the processing of produce in tank 1.

A wire 135 connected with conductor 131 extends to one terminal of a solenoid actuated switch 136 while the other terminal connects with a line 137 that, in turn is connected by wires 138, 139 with a terminal of conveyor motors 123, 119 respectively. The other terminal of motor 123 connects by wire 140 with conductor 130, and wire 130 also connects directly with one of the terminals of conveyor motor 121.

From this it is seen that when the circuit to the coil of relay 136 is broken, the motor 123 will be energized to actuate conveyor 122 for moving a load into the tube 1.

Figures 2, 3, 4, 5:
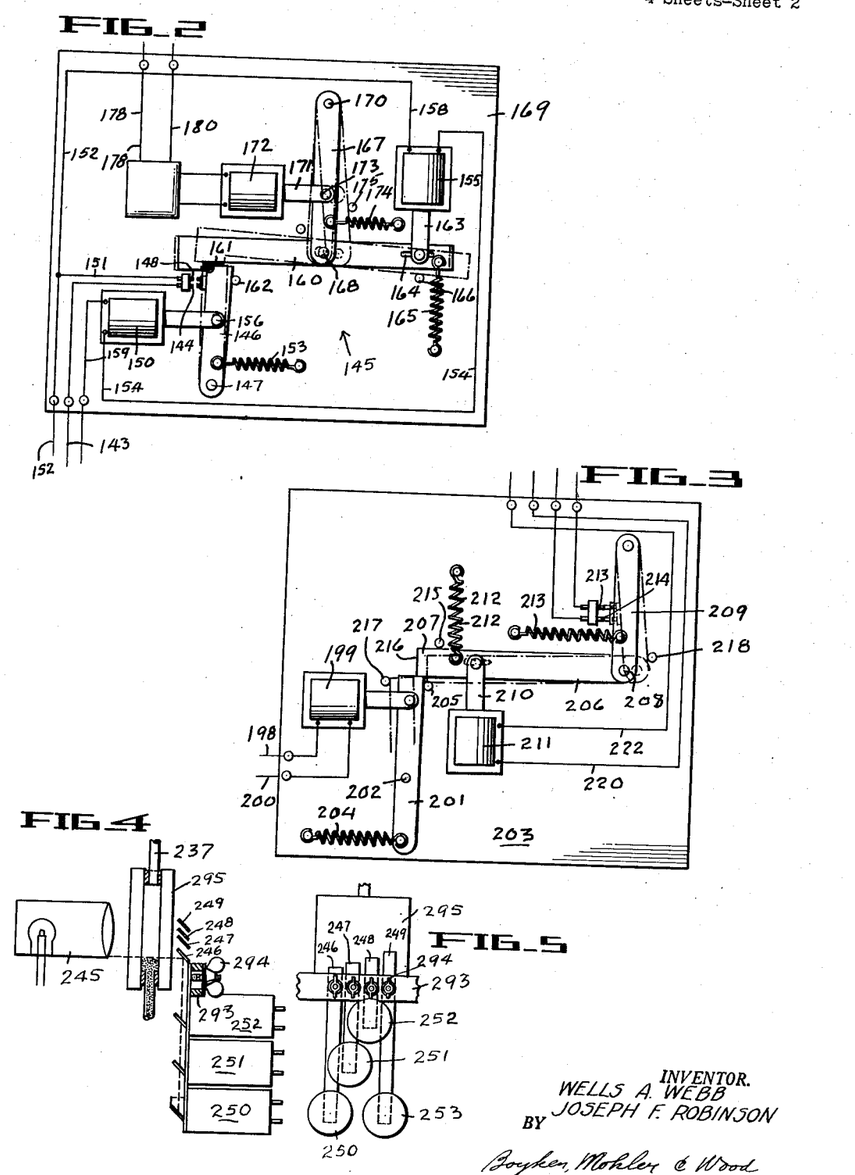
Figs. 2, 3, 4, 5 are views of different mechanisms in the electrical circuit that is shown in Fig. 1.

The other terminal of motor 119 is connected by a wire 143 with one terminal 144 (Figs. 1, 2) of a special mechanism generally designated 145 shown enlarged in Fig. 2. A switch arm 146 is pivoted at one end at 147 for connecting terminal 144 with a terminal 148 when the coil 150 is energized and terminal 148 is connected by a wire 151 with a conductor 152 that in turn connects with conductor 130. The core of coil 150 is connected at 156 with switch arm 146 for swinging the latter.

The switch arm 146 is connected with a spring 153 that acts to move the arm for disconnecting contacts or terminals 144, 148 when the coil 150 is deenergized.

One terminal of coil 150 is connected by a wire 154 with a terminal of another coil 155 and the other terminal of coil 155 is connected by a wire 158 with the line 152. Line 152, as has been described, is connected with the conductor 130.

The other terminal of coil 150 is connected by a wire 159 with conductor 137.

In the device 145, the switch arm 146 is releasably held in open position, or in a position in which contacts 144, 148 are disconnected, by a latch arm 160. This latch arm has a shoulder 161 at one end that engages the upper end of the switch arm 146, and said upper end of the said arm 146 may carry a roller at said shoulder to facilitate release of the arm 146 when the end of latch arm 160 on which said shoulder is formed is elevated (Fig. 2). A stop 162 prevents spring 153 from withdrawing the core of the coil 150 from said coil and limits outward movement of said core.

The core 163 of coil 155 is pivotally and slidably connected with the end of the latch arm 160 that is opposite the shoulder 161, a slot 164 being formed in said latch arm and extending longitudinally of the latter to permit longitudinal movement of said arm 160, and a spring 165 functions to hold the end of the latch bar at coil 155 against a stop 166 when coil 155 is de-energized.

A link 167 is pivotally connected at one end at 168 to latch arm 160 at a point intermediate the ends of the latter, and the other end of link 167 is pivotally secured to support 169 at 170. This link is at the same side of arm 160 as the coil 155 and extends generally perpendicularly to arm 160, therefore pivot 168 functions as a fulcrum about which the arm 160 is adapted to swing when the coil 155 is energized or de-energized.

Core 171 of a solenoid coil 172 is pivotally connected to link 167 at 173, the pivot 173 being spaced between the pivots 168, 170 at the ends of link 167. When the coil 172 is energized the link 167 will move latch arm 160 in a direction with the latch end of the arm leading, and when coil 172 is de-energized a spring 174 will move the arm 160 in a reverse direction until the link engages a stop 175.

One terminal of coil 172 is connected by a wire 178 with one terminal of photoelectric cell 127 (Fig. 1) that is at the discharge end of the tank 1 and adjacent to and above the level of the load in said tank, and the other terminal of the coil 172 is connected by a wire 180 with the other terminal of said cell. The light source for said cell is indicated at 181 which element is below the level of the load in tank 1 and also at the discharge end of said tank. Thus when the beam between the photocell units 127, 181 is broken by the load in the tank, the solenoid coil 172 will be de-energized and spring 174 will tend to move the arm 160 in a direction away from the latch end of the arm 160, or to the right as seen in Fig. 2.

Referring back to the relay switch 136 it was mentioned that when the circuit to the coil of relay 136 was broken the motor 123 would be actuated to move a load into the tank 1.

The circuit for coil 136 has the photoelectric cell 186 therein and which is connected with any suitable source of electricity, as has already been explained, and when the circuit for coil 136 is broken, the coil 136 is de-energized, and the door 2 when moved to position 32 breaks said beam from light source. This de-energizing of coil 136 releases the switch arm for closing the circuit through wires 138, 140 leading to motor 123 and through wires 143, 159 to coil 150 and through wires 154, 158 leading to coil 155. The current to coil 172 is also energized since there is no load (at the start) in the tank 1. This means that the circuit in wires 151, 143 leading to motor 119 is closed and this motor is running.

As soon as the load intercepts the beam to cell 127 the coil 172 is de-energized and immediately spring 174 jerks latch arm 160 to the right (as seen in Figs. 1, 2) to break the circuit 151, 152, 143 thus stopping motor 119.

The spring 153 will hold the switch arm 146 open as long as coil 150 is de-energized. Spring 165 will function to swing the latch end of the latch arm 160 out of holding engagement with the switch arm 146 so that a re-establishment of the current through coil 150 will enable the coil to pull the switch arm 146 to closed position before the coil 172 is energized by the light beam impinging cell 127 through the gap that will occur between the next load and the load that is in the tank 1.

It may here be mentioned that the conveyor motor 121 is adapted to receive its current through the wires 130 and 137 when coil 188 is energized and spring 189 moves switch 190 (Fig. 1) to open position. A wire 191 connects wire 137 with one contact of switch 190 and a wire 192 connects the other contact of switch 190 with one of the terminals of motor 121, while the other terminal of motor 121 is connected with conductor 130 by wire 193. As soon as the load that has been moved out of the tank 1 intercepts beam 194, and this will occur only after the complete load is out of said tank and door 3 can close, the motor 121 will stop and will not start again until the light beam is re-established, either by removal of the load from conveyor 120 or by the arrival of the gap between the load on the conveyor and the next succeeding load, since, as already stated, conveyor 120 may be several times or more as long as each full load. Also said conveyor may extend into a refrigerated room or car so as to conduct the load into such room or car, and it may be a continuously running conveyor or one that is actuated by a manually actuated switch or by a switch that is mechanically actuated by movement of the door 3. It is important, of course, that the conveyor 120 be actuated at a speed that at least equals that of the rate of speed of conveyor 118.

Fig. 3 is an enlarged view of a portion of the control circuit shown in Fig. 1 in which wire 173 is connected by a wire 198 with one terminal of a solenoid coil 199 and wire 180 is connected by a wire 200 with the other terminal of said coil. Thus when the beam on photoelectric cell 127 is interrupted the coil 199 will be de-energized, but when the cell receives light from its light source 181 the coil will be energized.

The core of said solenoid is connected with an arm 201 that is pivoted at a point 202 intermediate its ends to a support 203. The outer end of said arm remote from the core of said solenoid is connected with a spring 204 that reacts to yieldably urge the other end of the arm outwardly of coil 199 against a stop 205.

A second arm 206 is positioned so that one of its ends at 207 is adjacent to the end of arm 201 that is connected to the core of solenoid 197. Said arm 206 extends perpendicular to arm 201 in direction away from solenoid core 199 and the end of arm 206 opposite end 207 is pivoted at 208 to the end of a link 209, the latter being pivotally secured at its opposite end to support 203.

In Fig. 3 arm 206 is horizontally extending and arm 209 extends upwardly from the pivot 208 while arm 201 extends downwardly from the end 207 of arm 206.

A solenoid core 210 is connected with the arm 206 at a point intermediate its ends and extends into coil 211 that is below the arm 206. A spring 212 connects end 207 of arm 206 with the support 203 for yieldably pulling end 207 upwardly against the force of coil 211.

A coil spring 213 connects link 209 with support 203 and tends to yieldably urge the lower end of said link and also arm 206 in a direction toward the upper end of arm 201.

When said link 207 is at the limit of its movement in direction toward the arm 201, it will connect contacts 213, 214. A stop 215 limits the upward movement of the end 207 of arm 206 to a distance just sufficient to permit the end 207 to slide over the upper end of arm 201 to position 216, and stop 205 limits the downward movement of end 207 to a position in which the end of arm 206 is against a side of the upper end of arm 201.

A stop 217 limits the degree of movement of the upper end of arm 201 in direction toward coil 199, and a stop 218 limits the degree of movement of link 209 in direction away from contacts 213, 214.

One of the terminals of coil 211 is connected by a wire 220 with one terminal of a solenoid coil 221 and the other terminal of coil 211 is connected by a wire 222 with the other terminal of coil 221. The core of said coil 221 is adapted to actuate a switch arm 223 for movement into engagement with a contact 224 when said coil 221 is energized, and a wire 225 connects switch arm 223 with the contact 214 (Figs. 1, 3).

Current for wires 220, 222 is supplied from a source to the photocell 228, said cell being connected with said wires 220, 222 by wires 229, 230.

The source of light 231 for cell 228 is directed through the mercury pool container 232 that contains mercury 233, and a mask 234 spaced above the mercury is positioned so as to coact with the mercury upon a predetermined rise in the level of the latter to block off the light to the photo cell 228.

A tube 235 extends into pool 233 of mercury at one end and at the opposite end it communicates with the interior of tank 1. A branch tube 236 is connected with tube 235 and with one leg 237 of a U bend in the tube having mercury 238 therein to form a conventional manometer, generally designated 239.

The other leg 240 of the manometer is connected with a high efficiency vacuum pump 241. Thus it will be seen that the vacuum in tank 1 and the vacuum developed by pump 241 (the latter being capable of producing a 30 inch vacuum), will be in opposition at the manometer so that variations in the height of the column of mercury in leg 237 will be relatively slight within the range approaching from say a vacuum producing an absolute pressure in tank 1 of say between .1 and .088 lb. per square inch.

A source of light 245 is provided alongside leg 237 of the manometer which source may be masked except for a vertical slit that directs light through leg 237 at the mercury levels that will occur as the vacuum in tank 1 nears the maximum vacuum desired in tank 1.

At the side of the leg 237 are mirrors 246, 247, 248, and 249 at progressively different levels, and these mirrors reflect the light beams cast thereon from lamp 245 onto photocells 250, 251, 252, 253 that receive light from mirrors 246 to 249. Current is supplied to these cells from any suitable source, and current is supplied to lamp 245 through wire 254, the lamp being in series in a circuit the other of which is wire 255.

Solenoid coils 256, 257, 258 and 259 are respectively in the circuits for cells 250 to 253.

When the coil 256 is energized by reason of light falling on cell 250 the core will actuate the armature 260 for connecting wire 261 with wire 262, the latter being connected with contact 224, which has already been described.

Wire 261 is connected with a contact 262' that is adapted to be engaged by the armature of a coil 263'. This coil 263' receives its current through wires 264' that, in turn, are connected with a photocell 265, the latter being at the lower end of the door 1 so as to have its light intercepted by the door when the latter is closed.

The other contact 266 of the armature for coil 263' connects by a wire 267 with one of the contacts of solenoid coil 80. This is the solenoid that actuates sleeve valve 76 that, in turn, controls the flow of fluid that actuates the valve 50. A breaking of the current to coil 263' will result in closing the circuit 261, 267 and an actuation of the solenoid 80 for opening the valve 50 so as to connect the interior of the tank 1 with a high efficiency vacuum in header 42, but the circuit 261, 267 will not be completed until the door 2 is closed.

The circuit 270 in which cell 253 is positioned is at the opposite end of the mercury level range in leg 237, and this circuit connects with the coil 259. The armature switch 271 of coil 259 has one contact that is always connected with a wire 272 that, in turn, connects with a contact engageable by the armature of coil 256 when the latter is de-energized.

When coil 259 is energized, the armature for said coil connects the contacts of wires 273, 274 thus connecting said wires, and when the coil is de-energized the armature connects wires 275, 276.

Wire 274 is in an electrical circuit having a source 277 and it also connects by wires 278, 279 and 280 with one of the terminals of coils 80, 281 and 113 respectively.

Wire 273 connects by wires 282, 283 and 284 with one of the terminals of coils 81, 82, 83 respectively, and wire 275 connects with the terminal 224 that is engaged by switch arm 223, and said wire 275 also is directly connected with the power source 277.

Also when coil 259 is energized it connects wire 272 with a wire 285, which wire 285 connects with the other terminal of coil 81.

The armature of coil 258 is always connected by a wire 286 with one of the contacts that connects with the armature of coil 256 when the latter is de-energized.

When coil 258 is energized, the wire 286 is connected by a wire 287 with the other terminal of coil 82. When coil 257 is energized the wire 292 is connected by a wire 289 with the other terminal of coil 83, said wire 292 being always connected with the armature of coil 257 and extending from said armature to a contact that is engaged by the armature of coil 256 for connecting said wire 292 with wires 272 and 286 when the coil 256 is de-energized.

It should be noted (Fig. 4) that the cells 250 to 252 inclusive are preferably independently adjustable on a support 293 by separate thumb nuts 294. The mirrors 246 to 249 may be supported by suitable means in positions to reflect the light from the lamp 245 onto the several cells. The leg 237 of the manometer may be enlarged at 295 to enable the mercury in said enlargement to mask off the rays to the mirrors, in succession as the level in said enlargement rises, which rise is according to the degree of vacuum in tube 1.

The deenergizing of the coil 221 results in armature 223 connecting wire 276 with a wire 297 that leads to the other terminal of coil 113.

It should also be noted that the light 245 at the manometer is in series in a circuit 255, 298 that lead to a pair of contacts 299, 300. A switch arm 301 connects these contacts but an extension 302 of the solenoid core of coil 113 breaks the circuit by engagement with a right angle extension on arm 301 when coil 113 is energized.

This core of coil 113 connects with a slide valve in valve body 112. This valve body is connected by a pipe 304 with the main pressure line 88 and a branch connects the body with the exhaust line 93. Pipes 109 and 111 connect cylinder 107 with body 110.

Without being shown, it is to be understood that all photocells operate their associated solenoids through relays that amplify and give effective amounts of current to the solenoids.

*Operation*

In operation, commencing with an empty tank 1, and with doors 2, 3 in closed position, the first step is to turn on the electricity and to start pump 98 and the vacuum pumps or steam jets that are connected with the headers 42 to 45, the vacuum pumps or steam jets not being shown since they are conventional in vacuum cooling apparatus. Also, pump 241 is started.

The valve 128 is opened by hand. The contacts 213, 214 and 223, 224 and closed at the start and electricity flows from source 277 to energize solenoid 305 which raises valve 306 to permit fluid under pressure to enter pipe 41 and cylinders 16. Thus the doors 2, 3 will be opened.

When door 2 is fully open it will interrupt the beam to cell 186 and thereby stop the current flowing to solenoid 130 closing circuit 135, 137. The current from lines 130, 131 will now operate the motors 123, 119, 121, and the load on conveyor 123 will enter the tank 1 and will be carried to the end of the tank opposite door 2 at which time the load breaks the beam of light to cell 127.

The interrupting of the beam to cell 127 results in the arm 201 swinging clockwise (as seen in Fig. 3) about its pivot, and in link 167 swinging to the right about its pivot. This movement of arm 201 moves arm 206 to the right inasmuch as the coil 211 which was energized by light passing through the empty mercury column 235 into photocell 228 to draw the arm 206 downward. This clockwise motion of arm 201 results in its upper end catching the end of arm 206 and moving it to the right to break contacts 213, 214. The core in solenoid 113 accordingly drops so as to actuate the valve 112 for effecting a discharge of oil in line 41 to discharge pipe 93, thereby permitting the doors 2, 3 to move to closed position under the influence of gravity.

The closing of door 2 will interrupt the light beam to photocell 265 and thereby causing contacts 262, 266 to close.

Due to the fact that a high vacuum exists in the leg 240 of the manometer 238, the mercury column is well up in leg 240, it being remembered that atmospheric pressure is in tank 1. Hence virtually no mercury is in leg 237 of the manometer. Thus the light from source 245 reaches all cells 250 to 253 inclusive and the coils 256 to 258 are energized making contacts that close circuits 261, 262—289, 292—286, 287—272, 285—273, 274. Hence current flows from source 277 to energize coil 80, raising valve 76 which permits fluid under pressure to flow into line 66 for opening the valve 50 in tank 1. Air is then exhausted from tank 1 by means of a large jet or vacuum pump connected with header 42.

As for the air is exhausted from tank 1 the mercury level rises in leg 237 and falls in leg 240 of the manometer. Also mercury rises in tube 235 and interrupts the light to photocell 228 which results in the contact 224 being broken and the establishment of current in circuit 176, 197, which is preparatory for the next action.

When the mercury rises in leg 237 to interrupt the light to cell 250 the contacts for wires 272, 286 and 292 are made while the contact with wire 261 is broken. This results in stopping the current to coil 80, thereby closing valve 50, and in energizing the coils 81, 82, 83 to open valves 51, 52, 53 thereby causing the high vacuum to be established in tank 1.

In order to permit all parts of the load in the tank 1 to reach the desired temperature, the valves 51, 52, 53 are successively closed as the mercury in leg 237 progressively rises and shuts off the light to cells 251, 252, 253. The mirrors are adjustable to enable regulation of the closing of the valves.

When the mercury in leg 237 reaches the level for interrupting the light to cell 251 the coil 257 is de-energized and the contact for line 289 is broken, which results in closing valve 53.

When the mercury in leg 237 interrupts the light to cell 252 the coil 258 is de-energized and the contact with line 287 is broken resulting in valve 52 closing.

The mirror for cell 253 is adjusted to interrupt the light to said cell when the maximum desired vacuum is created in tank 1.

The valve 51, which is actuated for closing when the light to cell 253 is interrupted may be adjusted by a wedge slide 307 so that the amount of its opening is throttled, thus prolonging the period of time while the vacuum is raising from the level at which the light to cell 252 was interrupted, to the level at which the light to cell 253 will be interrupted. This gives the products of the load time to reach substantial equilibrium with respect to the temperature of its surfaces at the high vacuum. With lettuce, this may be from two to ten minutes while the vacuum is being raised say 29, 75 to 29, 82 Hg based on a 30 inch barometer.

Regulating valves 85, 86, 87 may be adjusted in advance to speed up or to slow down the rate of opening of valves 51, 52, 53 according to the requirement of a particular series of charges or loads of produce about to be loaded into tank 1.

The de-energizing of the coil 259 not only breaks contact with wire 233, but it also opens or breaks the circuit 273, 274 which is the general source for the coils 81, 82, 83.

When the coil 259 is de-energized, the wires 275, 276 are connected which actuates a coil 289 that opens valve 105 and admits air into tank 1. The letting of air into tank 1 causes the mercury in leg 237 of the manometer to fall and the coils 256, 257, 258 259 would be re-energized to re-establish the previously existing circuits were it not that the switch arm 301 has been moved by the core of coil 289 to break the circuit to light 245 thereby shutting off the light.

The contacts of wires 272, 286, 292 will remain made, and as soon as atmospheric pressure exists in tank 1 the light will fall on cell 228 and coil 221 is energized to make contact 224. The contacts of wires 276, 297 is broken and coil 289 is de-energized whereby valve 105 will be closed. The arm 301 will move to re-establish the circuit to light 245 and coils 250 to 259 inclusive are energized, thus breaking the contacts of wires 272, 286, 292 to prevent the valves 51, 52, 53 from opening, and the cycle is repeated.

Valve 105 that is shown for admitting air into chamber 1, may admit any other gas, such as any preservative gas, and which is preferably cooled before admitted.

It should be noted that slide valve 306 is in a valve body 308 that is similar to the body 110, but only the pressure and exhaust lines 309, 310 respectively with said valve body for actuating the cylinders 16 to open and close the doors.

In the manometer, the leg 237 is, of course, transparent, as is the tube 135.

The pump 241 has been described as being capable of producing a 30 inch vacuum. This is a conventional phrase, actually it should be capable of producing an absolute pressure of approximately 0.002 lb. per square inch or lower.

The header 42 connects with the primary vacuum system called a primer, and which removes the atmospheric air from tank 1, and will quickly produce a vacuum of substantially 29½ inches of mercury.

We claim:

1. In a vacuum tank having a horizontally directed open end, a door for said end, means supporting said door for movement from a vertical position closing said open end to an open position extending over the end of said tank at said open end and vice versa, and guide means for holding the lower end of said door relatively close to said open end of said tank during a substantial portion of its initial movement from said closed to said open position and for moving the upper end of said door outwardly of said open end during said portion of the movement of said door.

2. In a vacuum tank having a horizontally directed open end, a door for said end, means supporting said door for movement from a vertical position closing said open end to an open position extending over the end of said tank at said open end and vice versa, and guide means for tilting said door about a horizontal axis in a direction extending slantingly upwardly and outwardly relative to the end of the tank adjacent thereto during the initial period of movement of said door from said closed to said elevated position.

3. A horizontally extending vacuum tank open at its opposite ends, a door for closing each of said ends, means supporting said doors for movement to positions closing said ends, means for so moving each of said doors, means for supporting a tank load of material to be subjected to vacuum within said tank movable through one end of said tank into the latter and movable from within said tank out of the opposite end when said ends are open, means actuated by movement of such load of material into said tank for actuating the means for moving said doors to closed positions closing the ends of said tank when said load is fully within said tank.

4. A horizontally extending vacuum tank open at its opposite ends, a door for closing each of said ends, means supporting said doors for movement to positions closing said ends, means for so moving each of said doors, means for supporting a tank load of material to be subjected to vacuum within said tank movable through one end of said tank into the latter and movable from within said tank out of the opposite end when said ends are open, means actuated by movement of such load of material into said tank for actuating the means for moving said doors to closed positions closing the ends of said tank when said load is fully within said tank, air exhausting means communicating with the interior of said tank for exhausting air and vapors of evaporation from within said tank, a valve movable from closed position closing communication between said exhausting means and the interior of said tank to open position establishing said communication and vice versa, means actuated automatically by movement of one of said doors to closed position for moving said valve to said open position, pressure responsive means movable to different positions under the influence of pressure conditions within said tank, means automatically actuated by movement of said pressure responsive means to a predetermined position under a high vacuum condition within said tank for closing said valve.

5. A horizontally extending vacuum tank open at its opposite ends, a door for closing each of said ends, means supporting said doors for movement to positions closing said ends, means for so moving each of said doors, means for supporting a tank load of material to be subjected to vacuum within said tank movable through one end of said tank into the latter and movable from within said tank out of the opposite end when said ends are open, means actuated by movement of such load of material into said tank for actuating the means for moving said doors to closed positions closing the ends of said tank when said load is fully within said tank, air exhausting means communicating with the interior of said tank for exhausting air and vapors of evaporation from within said tank, a valve movable from closed position closing communication between said exhausting means and the interior of said tank to open position establishing said communication and vice versa, means actuated automatically by movement of one of said doors to closed position for moving said valve to said open position, pressure responsive means movable to different positions under the influence of pressure conditions within said tank, means automatically actuated by movement of said pressure responsive means to a predetermined position under a high vacuum condition within said tank for closing said valve, an air inlet in a wall of said tank, an air inlet valve movable from a closed position closing said air inlet to an open position opening said inlet to admission of air to within said tank; means actuated by movement of said pressure responsive means to said predetermined position for moving said air inlet valve to said open position.

6. A horizontally extending vacuum tank open at its opposite ends, a door for closing each of said ends, means supporting said doors for movement to positions closing said ends, means for so moving each of said doors, means for supporting a tank load of material to be subjected to vacuum within said tank movable through one end of said tank into the latter and movable from within said tank out of the opposite end when said ends are open, means actuated by movement of such load of material into said tank for actuating the means for moving said doors to closed positions closing the ends of said tank when said load is fully within said tank, air exhausting means communicating with the interior of said tank for exhausting air and vapors of evaporation from within said tank, a valve movable from closed position closing communication between said exhausting means and the interior of said tank to open position establishing said communication and vice versa, means actuated automatically by movement of one of said doors to closed position for moving said valve to said open position, pressure responsive means movable to different positions under the influence or pressure conditions within said tank, means automatically actuated by movement of said pressure responsive means to a predetermined position under a high vacuum condition within said tank for closing said valve, an air inlet in a wall of said tank, an air inlet valve movable from a closed position closing said air inlet to an open position opening said inlet to admission of air to within said tank; means actuated by movement of said pressure responsive means to said predetermined position for moving said air inlet valve to said open position, and means actuated by movement of said pressure responsive means to said predetermined position for actuating the means for moving said doors to said open position.

7. A horizontally extending vacuum tank open at its opposite ends, a door for closing each of said ends, means supporting said doors for movement to positions closing said ends, means for so moving each of said doors, means for supporting a tank load of material to be subjected to vacuum within said tank movable through one end of said tank into the latter and movable from within said tank out of the opposite end when said ends are open, means actuated by movement of such load of material into said tank for actuating the means for moving said doors to closed positions closing the ends of said tank when said load is fully within said tank, air exhausting means communicating with the interior of said tank for exhausting air and vapors of evaporation from within said tank, a valve movable from closed position closing communication between said exhausting means and the interior of said tank to open position establishing said communication and vice versa, means actuated automatically by movement of one of said doors to closed position for moving said valve to said open position, pressure responsive means movable to different positions under the influence of pressure conditions within said tank, means automatically actuated by movement of said pressure responsive means to a predetermined position under a high vacuum condition within said tank for closing said valve, an air inlet in a wall of said tank, an air inlet valve movable from a closed position closing said air inlet to an open position opening said inlet to admission of air to within said tank; means actuated by movement of said pressure responsive means to said predetermined position for moving said air inlet valve to said open position, and means actuated by movement of said pressure responsive means to said predetermined position for actuating the means for moving said doors to said open position, means for moving said load out of said opposite end of said tank actuated by movement of said pressure responsive means to said predetermined position after said doors are moved to said open position.

8. A vacuum tank, a plurality of headers connected with air exhausting means for producing a relatively high vacuum in said headers, passageways respectively connecting said headers with said tank and opening into the latter, a valve in each passageway supported for movement from a closed position closing each passageway against communication with the interior of said tank to an open position opening each passageway to said communication, pressure responsive means communicating with the interior of said tank movable to different positions in accordance with and under the direct influence of the pressure within said tank, separate means for moving each of said valves and means actuated by movement of said pressure responsive means to each of said different positions operably connected with each of said valves for separately moving each of said valves from open to closed position.

9. A vacuum tank, a plurality of headers connected with air exhausting means for producing a relatively high vacuum in said headers, passageways respectively connecting said headers with said tank and opening into the latter, a valve in each passageway supported for movement from a closed position closing each passageway against communication with the interior of said tank to an open position opening each passageway to said communication, pressure responsive means communicating with the interior of said tank movable to different positions in accordance with an under the direct influence of the pressure within said tank, separate means for moving each of said valves and means actuated by movement of said pressure responsive means to each of said different positions operably connected with each of said valves for separately moving each of said valves from open to closed position, means independent of the means that is actuated by said pressure responsive means for controlling the rate of movement of one of said valves.

10. In a vacuum tank that is connected with air exhausting means for exhausting air therefrom and which tank is horizontally disposed with open opposite ends, doors supported for movement from open positions opening said ends to closed position and vice versa, means for supporting a plurality of spaced loads for movement of said loads in succession into one end of said tank and out of the opposite end, each of said loads being adapted to substantially fill said tank, means for so moving said loads simultaneously whereby one load will be moving out of said tank while the next load is moving into said tank, and means actuated by movement of each load to fully enclosed position within each tank for moving said doors to said closed position, and for stopping the means for so moving said loads.

11. In a vacuum tank that is connected with air exhausting means for exhausting air therefrom and which tank is horizontally disposed with open opposite ends, doors supported for movement from open positions opening said ends to closed position and vice versa, means for supporting a plurality of spaced loads for movement of said loads in succession into one end of said tank and out of the opposite end, each of said loads being adapted to substantially fill said tank, means for so moving said loads simultaneously whereby one load will be moving out of said tank while the next load is moving into said tank, and means actuated by movement of each load to fully enclosed position within each tank for moving said doors to said closed position, and for stopping the means for so moving said loads, means responsive to a pressure within said tank of substantially .08 lb. per square inch for movement to a predetermined fixed position, means actuated by said movement for moving said doors to open position and for admitting air into said tank and for moving said load out of said tank.

References Cited in the file of this patent
UNITED STATES PATENTS

| | | |
|---|---|---|
| 1,967,346 | Barnby | July 24, 1934 |
| 2,171,921 | Duval | Sept. 5, 1939 |
| 2,601,566 | Soderquist | June 24, 1952 |
| 2,639,144 | Long | May 19, 1953 |